(12) United States Patent
Campbell et al.

(10) Patent No.: US 7,000,497 B1
(45) Date of Patent: Feb. 21, 2006

(54) SELECTIVELY POSITIONABLE GEARSHIFT AND METHOD

(76) Inventors: Harry Edward Campbell, 2202 Walker Tanner Rd., Union City, TN (US) 38261; Robert Edward Campbell, 133 Matheny Rd., Dresden, TN (US) 38225

( * ) Notice: Subject to any disclaimer, the term of this patent is extended or adjusted under 35 U.S.C. 154(b) by 519 days.

(21) Appl. No.: 10/128,196

(22) Filed: Apr. 22, 2002

(51) Int. Cl.
*G05G 1/04* (2006.01)

(52) U.S. Cl. .............................. 74/525; 74/544; 74/546

(58) Field of Classification Search .................. 74/543, 74/544, 546, 547, 473.1, 525
See application file for complete search history.

(56) References Cited

U.S. PATENT DOCUMENTS

| | | | |
|---|---|---|---|
| 3,464,288 A | | 9/1969 | Sheridan ...................... 74/525 |
| 3,665,785 A | * | 5/1972 | Moal ........................... 74/543 |
| 3,742,204 A | * | 6/1973 | Price ........................... 362/491 |
| 3,955,438 A | * | 5/1976 | Zakrzewski ............... 74/480 B |
| 4,237,629 A | * | 12/1980 | Schmidt ....................... 37/234 |
| 4,811,921 A | | 3/1989 | Whitaker ..................... 244/234 |
| 5,269,045 A | * | 12/1993 | DeSerio et al. ............... 16/422 |
| 5,413,008 A | * | 5/1995 | Brock ........................... 74/18 |
| 5,556,224 A | | 9/1996 | Niskanen .................... 403/379 |
| 5,769,363 A | | 6/1998 | Griswold .................... 244/234 |
| 6,029,535 A | | 2/2000 | Kenny ....................... 74/473.3 |
| 6,254,305 B1 | * | 7/2001 | Taylor ........................ 403/378 |
| 6,648,113 B1 | * | 11/2003 | Bellfy ....................... 192/3.63 |
| 2003/0079564 A1 | * | 5/2003 | Thiengtham ................. 74/525 |

OTHER PUBLICATIONS

"A Gearhead's Thoughts" by Ken Neher at www.magicnet.net, downloaded on Jun. 25, 2001.
Brothers Performance Warehouse at www.brothersperformance.com, downloaded on Sep. 9, 2001.
Advertisement by "Pro—5.0" in *Muscle Mustangs and Fast Fords*, of unknown date.
"Horsepower" by John Hedenburg, of unknown origin.
Advertisement by "Hurst Shifters" in *Muscle Mustangs and Fast Fords*, Sep. 2000.
Advertisement by "Race Parts" in *Muscle Mustangs and Fast Fords*, Sep. 2000.
"B&M Short Shifter & Momo Combat shit knob", downloaded from *2Phast Motorsports* at www.2phast.com on Sep. 9, 2001.
Advertisement by "B&M", of unknown origin.
Advertisement by "Steeda", of unknown origin.
Advertisement by "Steeda", of unknown origin.

\* cited by examiner

*Primary Examiner*—David Fenstermacher (57) ABSTRACT

An adjustable gearshift assembly (10, 130) for connecting by a bracket (16) to a transmission of a motor vehicle, providing a shifter knob (12, 132) movable to a selected position relative to an elongate member (14, 144). The shifter knob (12, 132) defines an elongate inner recess (26, 146) slidably received on the elongate member (14, 144). A holder connects to the shifter knob (12, 132) to fix the shifter knob (12, 132) in a selected position. The holder selectively releases to allow the shifter knob (12, 132) to be moved to a selected second position. The holder of the first embodiment includes a ball (92) which communicates through a port (90) between one of a plurality of seats in the elongate member (14) and a slot (80) in the actuator (70). The second embodiment provides a spring plunger (158) that maintains the position of the shifter knob (132) relative to the elongate member (144). A method of selectively positioning a gearshift is disclosed.

32 Claims, 4 Drawing Sheets

SELECTIVELY POSITIONABLE GEARSHIFT AND METHOD

TECHNICAL FIELD

The present invention relates to gearshifts. More particularly, the present invention relates to gearshifts for motor vehicles which provide selective positioning to accommodate comfortable reaching use by operators of motor vehicles and methods therefor.

BACKGROUND OF THE INVENTION

Motor vehicles typically have transmissions that couple the engine to the drive train so that the motor vehicle can move, while providing a range of gear ratios to facilitate moving the motor vehicle. Often the transmissions are selectively engaged using a lever known as a gearshift to place the transmission into a selected drive gear. For example, automatic transmissions typically provide for park, reverse, neutral, and several driving gears. Manual transmissions likewise provide for reverse, neutral, and several driving gears. In use, the gearshift is grasped by the operator of the motor vehicle and moved to the selected position for operation of the motor vehicle. Manual transmissions must be operated typically in conjunction with a clutch. Motor vehicles with manual transmissions often require a number of uses of the gearshift, in order to change the driving gears as driving conditions change.

The gearshift levers for transmissions are typically sized for convenient use by average sized drivers, and for most persons this is acceptable. The gearshift is neither too far nor too close for convenient access and use. However, for others, the length of the gearshift causes problems.

To accommodate differences in preferences for gearshift levers, there are a number of aftermarket gearshift levers. Some are relatively short, for persons with longer arms or with a preference for a short shift throw when changing gears of a transmission. Other replacement gearshifts are longer, to accommodate persons sitting further away from the transmission. While these devices have been successful in changing the gearshift lever for drivers to a preferred length, there are still drawbacks to their use. In particular, the throw length of the gearshift lever for one driver may not be suitable for another. For motor vehicles accessible for use by several persons, these aftermarket gearshifts are not generally satisfactory.

Accordingly, there is a need in the art for an improved gearshift lever selectively positionable for reaching use by an operator of a motor vehicle. It is to such that the present invention is directed.

BRIEF DESCRIPTION OF THE PRESENT INVENTION

The present invention meets the need in the art by providing an adjustable gearshift assembly for selectively moving a shifter knob among a plurality of alternate positions. The gearshift assembly includes a bracket base for connecting the gearshift assembly to a shifter of a transmission in a motor vehicle. An elongate member attaches to and extends from the bracket base. A shifter knob defines an elongate inner recess open at a first end. The recess slidably receives the elongate member for movement of the shifter knob relative to the elongate member to a selected position. A holder connected to the shifter knob communicates with the elongate member to fix the shifter knob in the selected position and is selectively releasable to allow the shifter knob to be moved to a selected second position. The shifter knob, being released from engagement with the elongate member by releasing the holder, is selectively movable relative to the elongate member to the second position and secured thereat by engaging the holder to the elongate member.

In another aspect, the present invention provides a method of selectively disposing a gearshift knob relative to an elongate member, comprising the steps of:

(a) releasing a holder from securing a shifter knob to an elongate member, the shifter knob defining an elongate recess for slidably receiving the elongate member;

(b) moving the shifter knob to a second position relative to the elongate member; and (c) re-engaging the holder to secure the shifter knob to the elongate member.

Objects, features, and advantages of the present invention will become apparent from a reading of the following detailed description of the invention and claims in view of the appended drawings.

DETAILED DESCRIPTION OF THE PREFERRED EMBODIMENT

Figure 1:
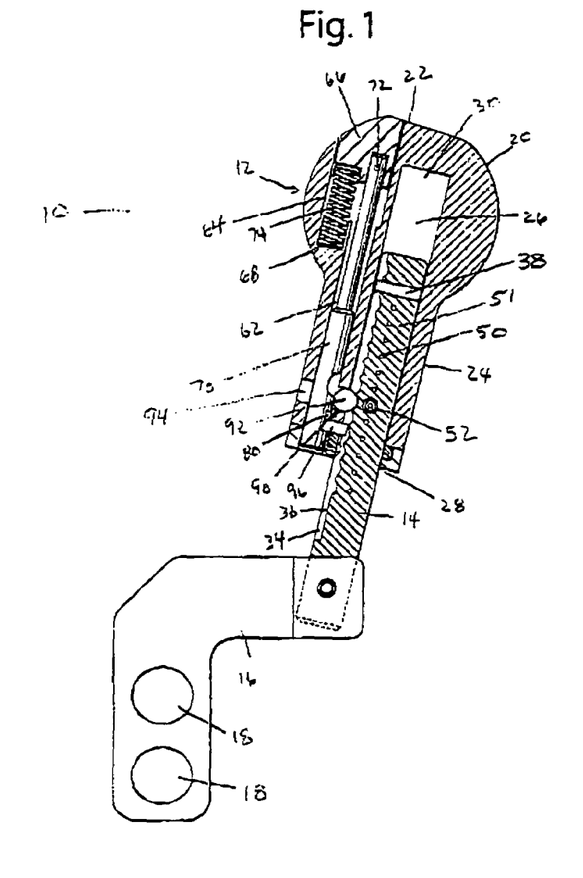
FIG. 1 is a cross-sectional side view of a gearshift in accordance with the present invention.
Figure 2:
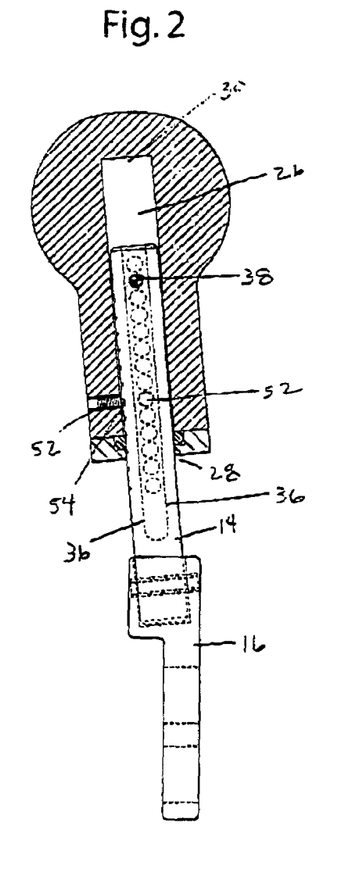
FIG. 2 is a cross-sectional front view of the gearshift illustrated in FIG. 1.

Referring now in more detail to the drawings, in which like numerals indicate like parts throughout the several views, FIG. 1 is a cross-sectional side view of an adjustable gearshift assembly 10 for use in a motor vehicle. FIG. 2 is a cross-sectional front view of the adjustable gearshift assembly 10, taken perpendicular to the view in FIG. 1. The adjustable gearshift assembly 10 permits an operator to selectively move a shifter knob 12 among a plurality of alternate extended positions to facilitate greater leverage in shifting gears and convenient reach to the shifter knob 12 by the operator during operation of the motor vehicle.

With reference to FIGS. 1 and 2, the shifter knob 12 moves between selected positions relative to an elongate member 14. The elongate member 14 connects to a bracket base 16 having apertures 18. The apertures 18 receive fasteners (not illustrated) for connecting the bracket base 16 and thus connecting the adjustable gearshift assembly 10 to a movable portion of a motor vehicle, such as a transmission gearshift.

The shifter knob 12 in the illustrated embodiment includes a generally spherical knob 20 with a planar surface 22 and a cylindrical stem 24. The shifter knob 12 is made of a suitable plastic or moldable material, and in the illustrated embodiment is formed with NYLATRON GS material. The shifter knob 12 defines an elongate recess 26 that extends from a first end 28 to a second end 30 in an interior portion of the shifter knob 12. The elongate recess 26 slidably receives the elongate member 14.

Figure 3:
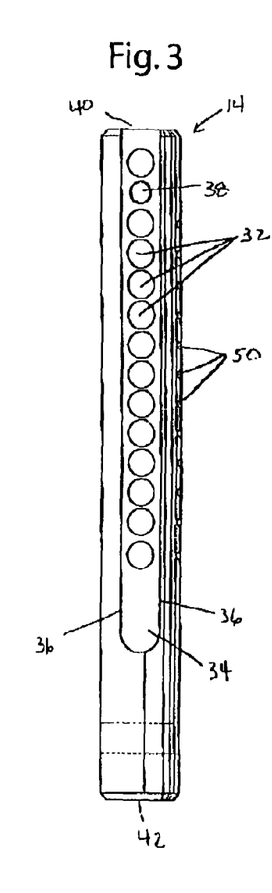
FIG. 3 is a front view of an elongate member used in the gearshift illustrated in FIG. 1.

The elongate member 14 is illustrated in a first front view in FIG. 3, and together with continued reference to FIGS. 1 and 2, the elongate member 14 defines a plurality of spaced-apart seats 32 in a first side. The seats 32 are formed centrally of a recessed channel 34 that has opposing sides 36. The channel 34 extends substantially the length of the member 14. A stop pin 38 projects from the channel 34 near an interior end 40 of the elongate member 14. An opposing end 42 connects to the bracket base 16. In the illustrated embodiment, a socket in the base 16 receives the end 42 and is secured with a pin.

Figure 4:
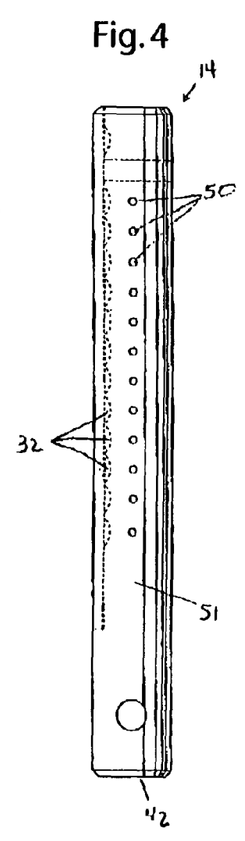
FIG. 4 is a side view of the elongate member illustrated in FIG. 3.

The elongate member 14 is also illustrated in a second side view in FIG. 4, and together with continued reference to FIGS. 1 and 2, the elongate member 14 defines a plurality of spaced-apart pin holes or notches 50 in a second side 51. The notches 50 in the illustrated embodiment align with the seats 32. As illustrated in FIG. 1 (and in side view in FIG. 2), a spring plunger 52 extends through an opening in the cylindrical stem 24. A tip 54 of a pin in the spring plunger 52 bears against the side 51 of the elongate member 14.

Returning to FIG. 1, the shifter knob 12 also defines a channel 62 that is spaced-apart from the recess 26. The channel 62 is open at the first end 28 of the shift knob 12 and at the surface 22. The shift knob 12 defines a counterbored portion 64 extending from the surface 22 inwardly for receiving a push button 66, as discussed below. A spring seat 68 extends inwardly from an inward end of the counterbored portion 64. The channel 62 slidably receives an actuator 70. The push button 66 connects by a locking pin 72 to a first end of the actuator 70. The spring seat 68 receives a spring 74 that bears against a seat in the push button 66.

Figure 5:
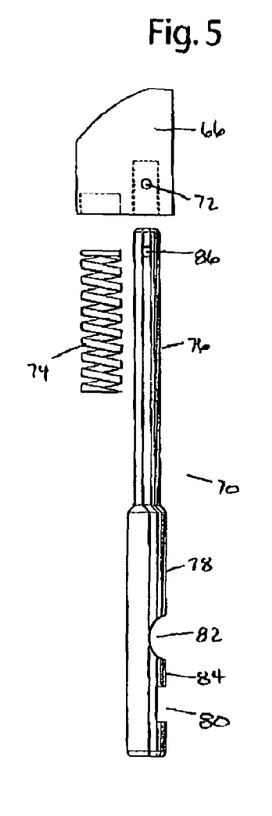
FIG. 5 is a side exploded view of an actuator used in the gearshift illustrated in FIG. 1.

FIG. 5 illustrates an exploded view of the actuator 70, the spring 74, and the push button 66. In the illustrated embodiment, the actuator 70 has a first portion 76 of a first diameter and a second portion 78 of a second diameter greater than the first diameter. The smaller diameter in the first portion 76 facilitates the push button 66 connecting to the spring 74. The second portion 78 defines a slot 80 and a dished notch 82 with a biasing face 84 therebetween. A hole 86 receives the locking pin 72 for securing the push button 66.

Returning to FIG. 1, the shifter knob 12 also defines a port 90 that communicates between the recess 26 and the channel 62. The port 90 receives a ball 92. In the illustrated embodiment, the ball 92 is a precision ceramic ball having a ¼ inch diameter. In the illustrated embodiment, a hole 94 in the cylindrical stem 24 aligns with the port 90 for entry of the ball 92 during assembly of the gearshift 10, as discussed below. However, the ball 92 may also be inserted through the open end of the cylindrical stem 24 during the assembly of the gearshift 10.

The port 90 is recessed inwardly of the first end 28. The slot 80 receives a key 96 having a face extending into the channel 34 between the sides 36. As discussed below, the key 96 prevents the shifter knob 12 from rotation about the elongate member 14 when the shifter knob 12 is moved between selected positions.

Figure 6:
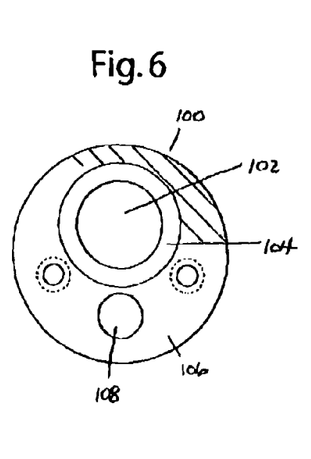
FIG. 6 is a plan view of an end cap used in the gearshift illustrated in FIG. 1.

FIG. 6 is a plan view of an end cap 100 that defines two holes for receiving screws (not illustrated) for attaching the end cap to the first end 28 of the shifter knob 12. The end cap 100 defines a central opening 102 which receives a spring washer 104. The spring washer 104 is an annular ring with a U-shaped cross-section that receives a spring. The spring is preferably made of polytetrafluroethylene. Such spring washers are available from MACMASTER CARR, of Atlanta, Ga. In the illustrated embodiment, the central opening 102 is recessed so that the spring washer 104 seats flush with a surface 106 of the end cap. The end cap 100 also defines an actuator opening 108 sized for passage of a portion of the actuator 70.

Figures 7, 8:
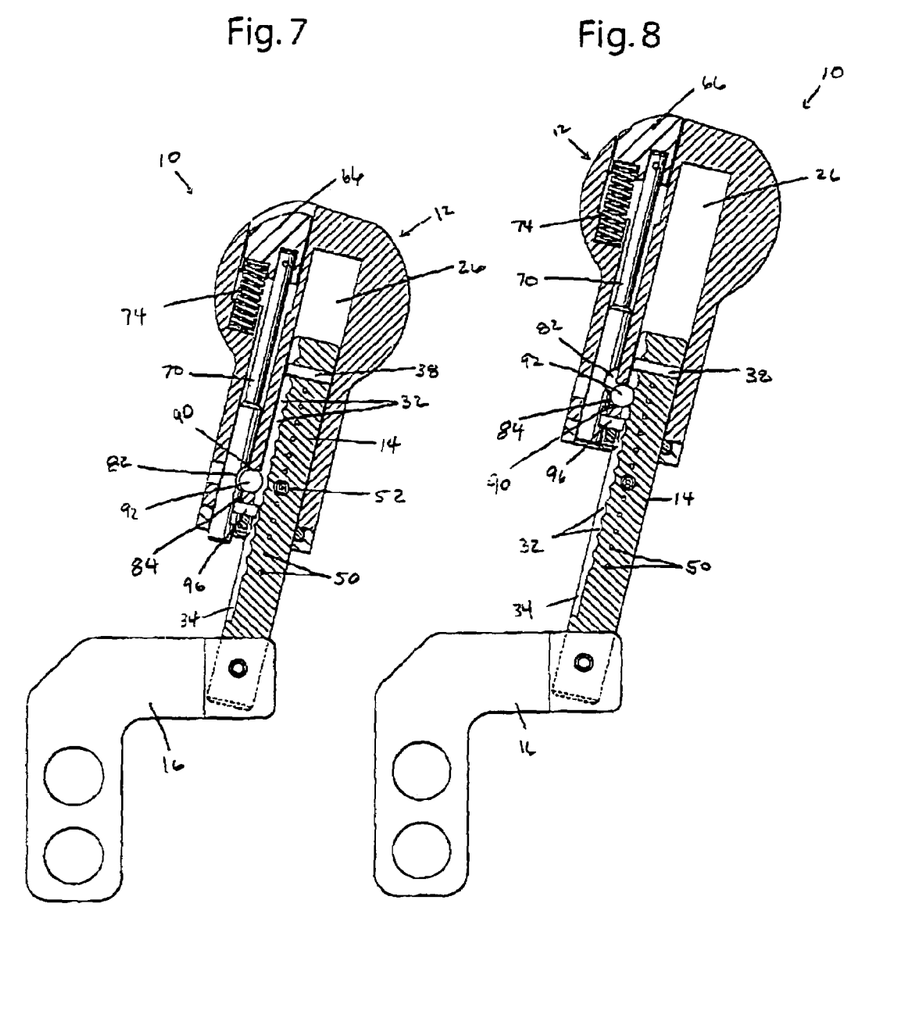
FIG. 7 is a cross-sectional view of the gearshift illustrating operational features thereof.
FIG. 8 is a cross-sectional view of the gearshift in a second position.

FIG. 7 illustrates the gearshift 10 with the actuator 70 moved to a second position in which the dished notch 82 aligns with the port 90.

FIG. 8 illustrates the shifter knob 12 moved longitudinally relative to the elongate member 14 to a second position.

Figure 9:
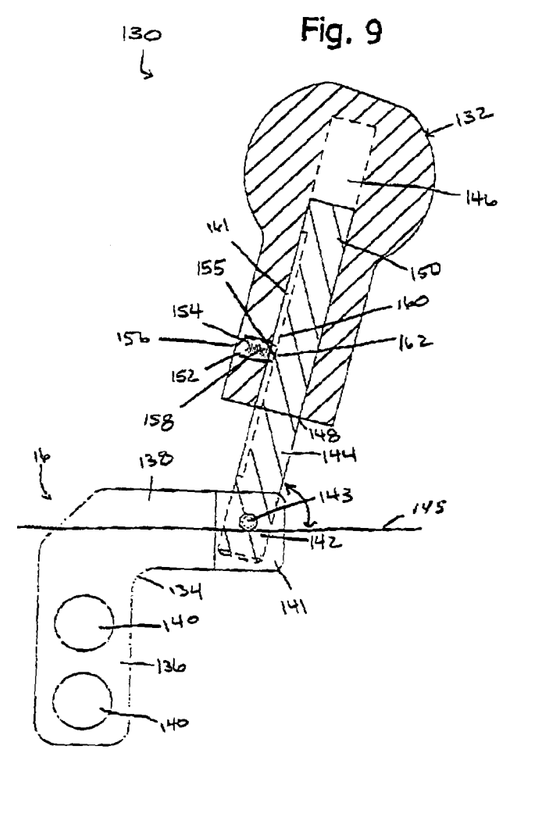
FIG. 9 is a side-elevational view of an alternate embodiment of a gearshift according to the present invention.
Figure 10:
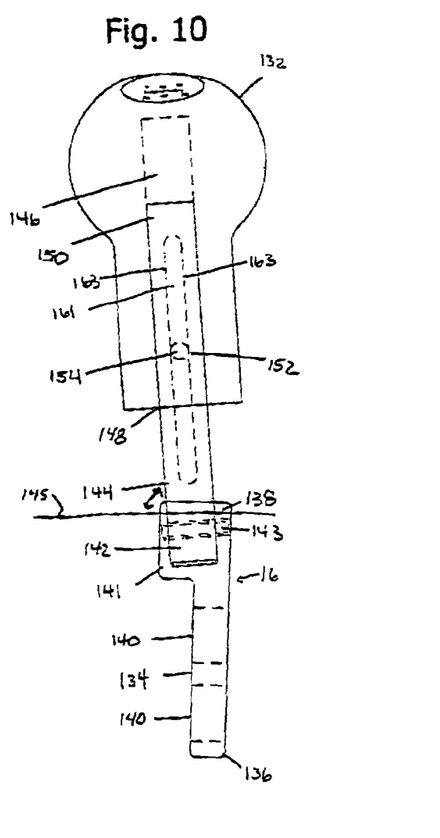
FIG. 10 is an end-elevational view of the alternate embodiment of the gearshift shown in FIG. 9.

FIG. 9 illustrates a side elevational view of an alternate embodiment of an adjustable gearshift assembly 130 according to the present invention for moving a shifter knob 132 to a selected operating position. FIG. 10 illustrates an end elevational view of the gearshift 130 of FIG. 9. The gearshift assembly 130 includes the bracket base 16 adapted for connecting to a shifter of a transmission (not illustrated) in a motor vehicle. The bracket base 16 comprises an angle member 134 having a mounting arm 136 and a laterally extending connecting arm 138. The mounting arm 136 defines a pair of bores 140 for receiving fasteners (not illustrated) to mount the angle member 134 to the transmission shifter (not illustrated). In the illustrated embodiment, a socket 141 in the connecting arm 138 receives a first end 142 of an elongate member 144. The elongate member 144 rigidly connects to the socket, such as by welding, swedge, force-fit, and other rigid connection mechanisms. In the illustrated embodiment, a pin 143 further secures the elongate member 144 in the socket. The elongate member 144 extends from the socket 141 at an oblique angle relative to a plane 145 defined by the connecting arm 138, as illustrated in FIGS. 9 and 10.

The shifter knob 132 defines an elongate inner recess 146. The recess 146 slidably receives a second end 150 of the elongate member 144. The shifter knob 132 further defines a passageway 152 substantially transverse to the elongate inner recess 146. A spring plunger 154 with a threaded exterior is fixedly received in the passageway 152. The spring plunger 154 includes an adjustor 156 that selectively biases an internal spring 158 against the face 160 of the elongate member 144. In the illustrated embodiment, the face 160 defines a channel 161 with opposing sides 163 and the face 160 defining a recessed surface in the channel 161. The channel 161, similar to the channel 34 discussed above, extends substantially the length of the elongate member 144. The sides 163 restrain the shifter knob 132 from rotating relative to the elongate member 144. In an alternate embodiment, the channel 161 defines a plurality of spaced-apart seats 162. The spring 158 bears against a selected one of the seats to hold the shifter knob 132 at a selected position relative to the elongate member 144.

With reference back to FIGS. 1 and 2, the gearshift 10 assembles by connecting the push button 66 to the actuator 70 with the locking pin 72. The spring 74 inserts into the spring seat 68, and the actuator 70 inserts into the channel 62, disposing the push button 66 at the surface 22 of the shift knob 12. The ball 92 inserts through the hole 94 and rests in the port 90 adjacent the actuator 70.

The elongate recess 26 receives the elongate member 14. The push button 66 is depressed so that the elongate member 14 can move past the ball 92.

The key 96 fits into the slot 80 and the edge extends into the channel 34 of the elongate member 14. The push button 66 is partially depressed to permit fitting the key 96 into the slot 80. The end cap 100 attaches to the first end 28 of the shifter knob 12 with two screws (not illustrated). The spring plunger 52, threaded into the opening of the cylindrical stem 24, sets the tip 54 of the pin in the spring plunger 52 against the side 51 of the elongate member 14. The opposing end 42 rigidly connects to the socket in the bracket base 16.

The elongate member 14, the bracket base 16, and the actuator 70 are preferably made of rigid steel, such as 4150 tool steel.

For use, the gearshift 10 of the present invention illustrated in FIGS. 1 and 2 replaces the standard gearshift lever of the motor vehicle. In the illustrated embodiment, fasteners securing the standard shift lever are used to secure the gearshift 10, for example, to a transmission of a motor vehicle. The adjustable gearshift 10 may also be gainfully used as original equipment from motor vehicles manufacturers. With reference to FIG. 1, the shifter knob 12 is in the locked position relative to the elongate member 14. This is accomplished by the biasing face 84 of the actuator 70 bearing against the ball 92 in the port 90. The biasing face 84 secures the ball 92 in one of a plurality of seats 32 in the elongate member 14.

With reference to FIGS. 7 and 8, the shifter knob 12 is selectively repositioned in order to increase or decrease the length of the gearshift 10. This is accomplished by initially depressing the push button 66. The push button 66 compresses the spring 74 while the actuator 70 moves to its second position. The actuator 70 moves the biasing face 84 from engagement with the ball 92 and brings the dished notch 82 into alignment with the ball 92, as is best illustrated in FIG. 7. The ball 92 then is movable in the port 90 into the dished notch 82 and out of engagement with the elongate member 14.

With the push button 66 depressed, the shifter knob 12 is movable relative to the elongate member 14 to a selected second position. The edges of the dished seats 32 move the ball 92 in the port 90 and into the notch 82.

As the shifter knob 12 moves, the edge of the key 96 moves within the recessed channel 34. The opposing sides 36 of the recessed channel 34 guide the movement of the key 96 relative to the channel 34 and also prevent the shifter knob 12 from rotation about the elongate member 14.

It is to be appreciated that the stop pin 38 prevents the shifter knob 12 from extending relative to the elongate member 14 beyond a selected length. When the shifter knob 12 moves to the extent of the elongate member 14, the stop pin 38 bears on the face of the key 96 and prevents further extending telescopic movement of the shifter knob 12 relative to the elongate member 14. The substantially spherical knob 20 is conveniently and comfortably grasped for operation of the shifter assembly 10, and other configurations and shapes may be gainfully used as well as provide alternate ornamental effects.

With the gearshift 10 moved to the selected second position, the shifter knob 12 is locked relative to the elongate member 14. With reference to FIGS. 1 and 8, this is accomplished by releasing the push button 66. The spring 74 biases the actuator 70 to its first position with the push button 66 flush with the surface 22 of the knob 20. As the actuator 70 moves relative to the port 90, the ball 92 squeezes out of the notch 82 and moves in the port 90 towards the elongate member 14. The biasing face 84 moves against the ball 92. The biasing face 84 holds the ball 92 in the port 90 and in one of the seats 32. The shifter knob 12 is thus engaged with the elongate member 14 at the second position, as is shown in FIG. 8.

The spring and spring washer 104 in the illustrated embodiment dampen vibration in the gearshift 10 when the vehicle is in use. Additionally, although not needed for operation, the tip 54 of the spring plunger 57 functions as a locator pin. The tip 54 slides along the surface of the elongate member 14 and into the spaced-apart notches 50 as the shifter knob 12 moves from the first position to the second position. This provides a signal as to the relative location of the shifter knob 12 during repositioning. The spring washer 104 and the spring plunger 54 are both available from McMaster Carr, of Atlanta, Ga.

With reference to FIGS. 9 and 10, the gearshift 130 of the alternate embodiment assembles by inserting the second end 150 of the elongate member into the elongate inner recess 146 of the shifter knob 132. The elongate member 144 preferably friction fits within the inner recess 146. The spring plunger 154 is threaded into the opening of the passageway 152 until the tip 155 of the pin in the spring plunger 154 is pressed against the face 160 of a selected seat 162 on the elongate member 144. Spring plungers are available from McMaster Carr, of Atlanta, Ga. The force of the spring is in a range from about 4 to 8 pounds, and the applied force is adjusted by the adjuster 156. The opposing end 142 rigidly connects to the socket 141 in the bracket base 16.

It is to be appreciated that the bracket base 16 provides an arm that moves the pivot point of the gearshift along the longitudinal axis of the motor vehicle, for example, forwardly. An alternate embodiment (not illustrated) within the scope of the present invention, however, does not use the bracket base. Rather, the elongate member is adapted to connect directly to the transmission shifter by forming a flattened end portion that defines two holes for receiving fasteners to secure the gearshift to the transmission shifter.

In use, the gearshift 130 replaces the standard gearshift lever of the motor vehicle in the same manner as that of the gearshift 10 illustrated in FIGS. 1 and 2. With reference to FIG. 9, the shifter knob 132 is in the locked position relative to the elongate member 144. This is accomplished by the tip 155 of the spring plunger 154 biasing against the face 160 of a selected seat 162 in the elongate member 144. The spring 158 within the spring plunger 154 secures the tip 155 of the plunger 154 to the elongate member 144 and prevents movement of the shifter knob 132 relative to the elongate member 144.

The shifter knob 132 however readily repositions on the elongate member 144, thus lengthening or shortening the throw length of the gear shifter 130. The length of the gearshift 130 may be increased by exerting an upward force on the shifter knob 132 greater than the biasing force exerted by the spring 158 on the tip 155 of the spring plunger 154 to the elongate member 144. Such an upward force moves the tip 155 of the spring plunger 154 from engagement with the seat 162 and along the face of the elongate member 144. With the upward force greater than the biasing force of the spring 158, the shifter knob 132 is movable relative to the elongate member 144 to a second selected position.

With the gearshift 130 moved to the second selected position, the shifter knob 132 is locked relative to the elongate member 144. This is accomplished by decreasing the upward force exerted on the shifter knob 132 to a force less than the biasing force exerted by the spring 158. The spring 158 biases the tip 155 of the spring plunger 154 to the elongate member 144 and into one of the seats 162. The spring 158 holds the tip 155 of the plunger 154 in the seat 162 and the shifter knob 132 is thus engaged with the elongate member 144 at the second position.

Alternately, the length of the gearshift 130 may be decreased by exerting a downward force on the shifter knob 132 greater than the force exerted by the spring 158 to bias the tip 155 of the spring plunger 154 to the elongate member 144. The downward force of the shifter knob 132 relative to the elongate member 144 dislodges the tip 155 of the spring plunger 154 from engagement with the seat 162 and causes the tip 155 to drag along the face of the elongate member 144. With the downward force greater than the biasing force of the spring 158, the shifter knob 132 is movable relative to the elongate member 144 to a second selected position.

With the gearshift 130 moved to the second selected position, the shifter knob 132 is once again locked relative to the elongate member 144. Locking is accomplished by decreasing the downward force exerted on the shifter knob 132 to a force less than the biasing force exerted by the spring 158. The spring 158 biases the tip 155 of the spring plunger 154 to the elongate member 144 and into one of the seats 162. The spring 158 holds the tip 155 of the plunger 154 in the seat 162 and the shifter knob 132 is thus engaged with the elongate member 144 at the second position.

The present invention accordingly provides a shifter knob selectively positionable relative to the elongate member that attaches to the transmission for the motor vehicle, to accommodate use by different persons, even during operation of the motor vehicle. The shifter assembly according to the present invention displaces the shift pivot point relative to the transmission, while angling the shifter knob relative to the operator of the motor vehicle when seated in the customary operating seat. This provides a subjectively improved shift throw for the operator using the gearshift of the present invention to selectively position the gearshift for a low retracted position (for a short throw length) and a higher extended position (for a longer throw length), to accommodate the preferences of different operators of the motor vehicle. Although the disclosed embodiments use locking mechanisms or holders having a ball-and-seat mechanism and a spring plunger, other mechanical locking devices such as a key-and-notch structures, a pin-in-hole connection, twist-lock, friction fit, or a rack-and-pinion connection may also be gainfully used to achieve the result of selectively changing the throw length of the shifter assembly without deviating from the scope of the invention. For example, in an alternate embodiment, the shift knob is twistable rotatingly relative to the elongate member between a fixed position and a movable position, so as to permit moving the shifter knob to the second selected position where the knob is reverse twisted to again be held in the selected position. Also for example, a spring-biased pin engages one of a plurality of holes in the elongate member and is selectively retractable to allow the shifter knob to be disengaged from the elongate member for repositioning.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the following claims.

What is claimed is:

1. An adjustable gearshift assembly for changing transmission gears of a vehicle, comprising:
   an elongate member having a nonvariable length;
   a shifter knob having an elongate inner recess open at a first end and slidably received over the elongate member for longitudinal movement of the shifter knob relative to the elongate member to a selected position; and
   a holder operatively engaged to fix the shifter knob in the selected position, said holder selectively released to allow the shifter knob to be moved to a selected second position over the elongate member;
   whereby the shifter knob, being released from engagement with the elongate member by releasing the holder, is selectively movable relative to the elongate member to the second position and secured thereat by engaging the holder to the elongate member.

2. The gearshift assembly as recited in claim 1, wherein the holder connects to the shifter knob and communicates with the elongate member to hold the shifter knob in position.

3. The gearshift assembly as recited in claim 1, wherein the elongate member is adapted for connection by attaching at a first end to a bracket base that has holes.

4. The gearshift assembly as recited in claim 3, wherein the bracket base comprises an angle member having a mounting arm and a laterally extending connecting arm, the connecting an rigidly engaged to a first end of the elongate member.

5. The gearshift assembly as recited in claim 4, wherein the elongate member extends at an oblique angle relative to a plane defined by the connecting member.

6. The gearshift assembly as recited in claim 1, wherein:
   the shifter knob further comprises a passageway substantially transverse to the inner recess; and
   the holder further comprises a spring plunger having a treaded exterior and an internal spring that bears against the elongate member, the spring plunger fixedly received in the passageway.

7. The gearshift assembly as recited in claim 6, wherein the spring plunger further comprises an adjuster for selectively biasing the spring against the elongate member, wherein the holder releases upon application of a longitudinal force to the shifter knob exceeding a lateral holding force of the spring.

8. The gearshift assembly as recited in claim 7, wherein the elongate member defines a plurality of spaced-apart seats in a surface for engagement by the spring.

9. The gearshift assembly as recited in claim 1, wherein the elongate member defines a plurality of spaced-apart seats in a surface for engagement by the holder.

10. The gearshift assembly as recited in claim 1, wherein the holder comprises:
    a port communicating with the inner recess of the shifter knob;
    a ball received in the port and selectively movable between a first position in engagement with the elongate member and a second position remote therefrom, for selective movement of the shifter knob when the ball is in the second position; and
    means for moving the ball between the first and the second positions.

11. The gearshift assembly as recited in claim 10, further comprising:
    an inner channel in the shifter knob adjacent to the inner recess; and
    an actuator received in the inner channel having a slot for receiving the ball and a biasing face adjacent the slot, the actuator movable from a first position with the biasing face bearing against the ball to secure the ball against the elongate member and a second position with the ball in the slot for disposing the ball out of engagement with the elongate member as the shifter knob moves to the second position relative to the elongate member.

12. The gearshift assembly as recited in claim 11, wherein the actuator further comprises:
   a notch;
   a key received in the notch, the key protruding from the actuator into the inner recess of the shifter knob; and
   a stop pin protruding from the elongate member,
   whereby the shifter knob is stopped from extending telescopic movement relative to the elongate member by the stop pin bearing on the edge of the key.

13. The gearshift assembly as recited in claim 11, wherein the recess and the inner channel are substantially parallel and spaced-apart.

14. The gearshift assembly as recited in claim 10:
   wherein the elongate member further comprises a plurality of seats disposed along a length of the elongate member for receiving the ball in the first position.

15. The gearshift assembly as recited in claim 14, wherein said seats are dished.

16. The gearshift assembly as recited in claim 14, wherein the elongate member further comprises:
   a plurality of spaced-apart notches in a portion of the surface away from the plurality of seats; and
   a locator member extending from an inner wall of the inner channel to contact the elongate member in alignment with the plurality of notches;
   whereby the locator member, being received in a sequence of the plurality of notches as the shifter knob moves from the first position to the second position, signals the relative longitudinal location of the shifter knob.

17. The shifter knob as recited in claim 16, wherein the notches are each aligned with a respective one of the seats.

18. An adjustable gearshift assembly for selectively moving a shifter knob among a plurality of alternate positions, comprising:
   a shifter knob comprising an inner recess, an inner channel, and a port for communicating between the inner recess and the inner channel;
   an elongate member of fixed and nonvariable length having a surface defining a plurality of spaced-apart seats, the elongate member slidably received in the inner recess of the shifter knob for selective movement of the shifter knob relative to the elongate member;
   a ball received in the port for selective positioning in one of the spaced-apart seats in the elongate member;
   an actuator received in the inner channel of the shifter knob, said actuator having a slot for receiving the ball and a biasing face adjacent the slot, the actuator movable from a first position with the biasing face bearing against the ball to secure the ball in one of the plurality of seats and a second position with the ball in the slot for holding the ball out of engagement with the elongate member as the shifter knob moves from a first position to a second position relative to the elongate member; and
   a bracket for coupling the elongate member to a vehicle, whereby the shifter knob, being released from engagement with the elongate member by moving the actuator to its second position with the ball being received in the slot, is selectively movable relative to the elongate member to a second position and secured thereat by moving the actuator to its first position.

19. The gearshift assembly as recited in claim 18, further comprising a spring member to bias the actuator to the first position.

20. The gearshift assembly as recited in claim 18, wherein the actuator further comprises:
   a notch in a portion remote from the first end thereof;
   a key received in the notch, the key protruding from the actuator into the inner recess of the shifter knob; and
   a stop pin protruding from the elongate member,
   whereby the shifter knob is stopped from extending telescopic movement relative to the elongate member by the stop pin bearing on the edge of the key.

21. The gearshift assembly as recited in claim 18, wherein the bracket comprises:
   a bracket base adapted to couple to a vehicle at one end; and
   a second end of the elongate member journaled to the bracket base.

22. The gearshift assembly as recited in claim 21, wherein said bracket base defines at least one aperture for receiving a connector to secure the gearshift assembly to a vehicle.

23. The gearshift assembly as recited in claim 18, wherein the recess and the inner channel are substantially parallel and spaced-apart.

24. The gearshift assembly as recited in claim 18, wherein said seats are dished.

25. The gearshift assembly as recited in claim 18, wherein the elongate member further comprises:
   a plurality of spaced-apart notches separate from the plurality of seats; and
   a locator member extending from an inner wall of the inner channel to contact the elongate member in alignment with the plurality of notches;
   whereby the locator member, being received in a sequence of the plurality of notches as the shifter knob moves from the first position to the second position, signals the relative location of the shifter knob.

26. The shifter knob as recited in claim 25, wherein the notches are each aligned with a respective one of the seats.

27. An adjustable gearshift assembly for moving a shifter knob to a selected operating position, comprising:
   an elongate member having a fixed and nonvariable length and adapted for connecting to a transmission shifter in a motor vehicle;
   a shifter knob having an elongate inner recess open at a first end and slidably received on the elongate member for longitudinal movement of the shifter knob along the elongate member to a selected position; and
   a holder connected to the shifter knob and communicating with the elongate member to fix the shifter knob in the selected position, said holder selectively released to allow the shifter knob to be moved to a selected second position,
   whereby the shifter knob, being released from engagement with the elongate member by releasing the holder, is selectively movable along the elongate member to the second position and secured thereat by engaging the holder to the elongate member.

28. The gearshift assembly as recited in claim 27, further comprising:
   a bracket base that has holes for connecting to the transmission shifter; and
   wherein the elongate member connects at a first end to the bracket base.

29. The gearshift assembly as recited in claim 28, wherein the bracket base comprises an angle member having a mounting arm and a laterally extending connecting arm, the connecting arm rigidly engaged to a first end of the elongate member.

30. The gearshift assembly as recited in claim 29, wherein the elongate member extends at an oblique angle relative to a plane defined by the connecting member.

31. The gearshift assembly as recited in claim 28, wherein:

the shifter knob further comprises a passageway substantially transverse to the recess; and the holder further comprises a spring plunger having a threaded exterior and an internal spring that bears against the elongate member, the spring plunger fixedly received in the passageway.

32. The gearshift assembly as recited in claim 31, wherein the spring plunger further comprises an adjuster for selectively biasing the spring against the elongate member, wherein the holder releases upon application of a longitudinal force to the shifter knob exceeding a lateral holding force of the spring.

* * * * *